Sept. 15, 1931. N. A. CHRISTENSEN 1,823,588
LOCKING MEANS FOR FLUID PRESSURE BRAKES
Filed June 28, 1926 3 Sheets-Sheet 1
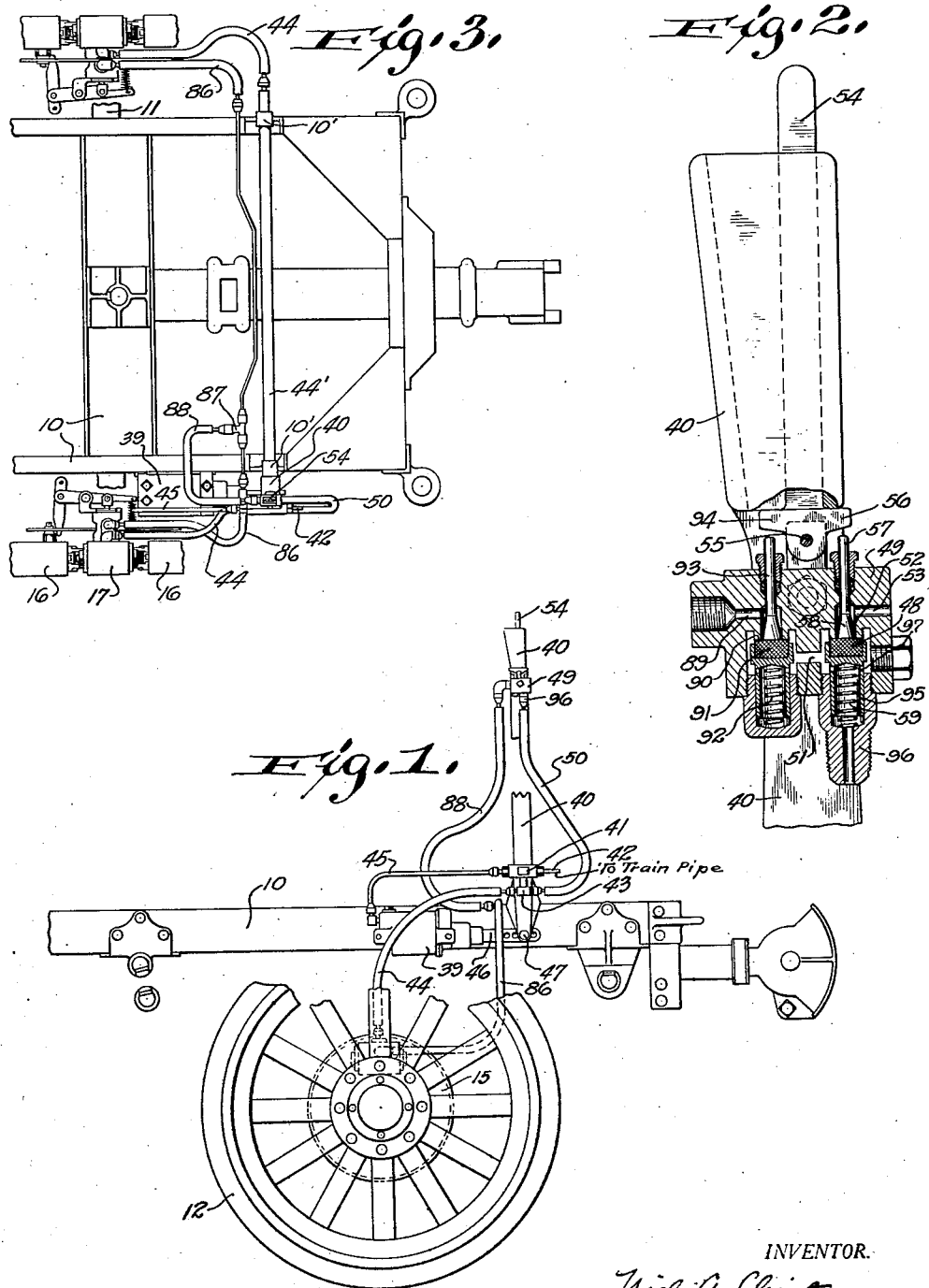

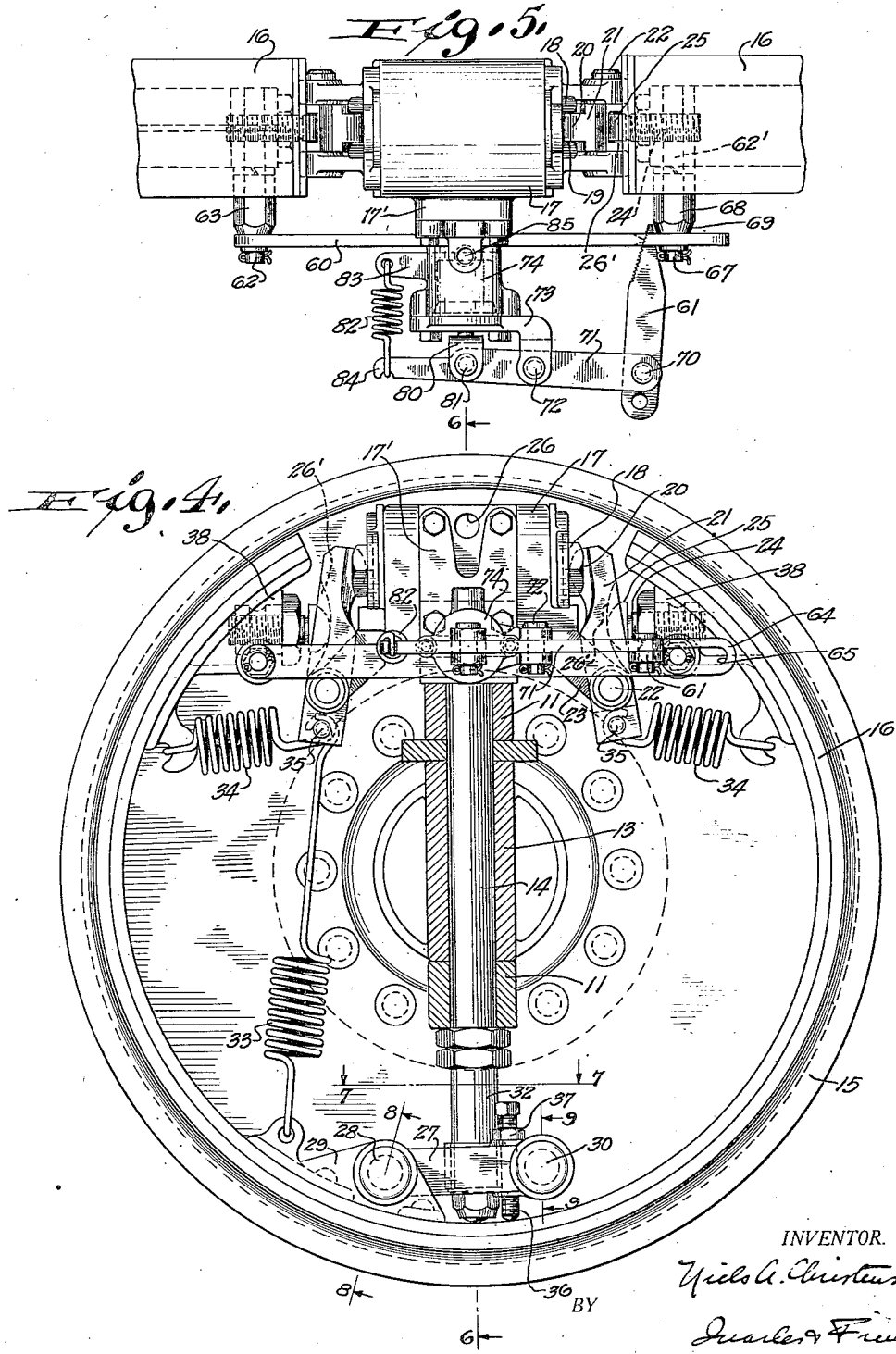

Sept. 15, 1931.  N. A. CHRISTENSEN  1,823,588
LOCKING MEANS FOR FLUID PRESSURE BRAKES
Filed June 28, 1926  3 Sheets-Sheet 3
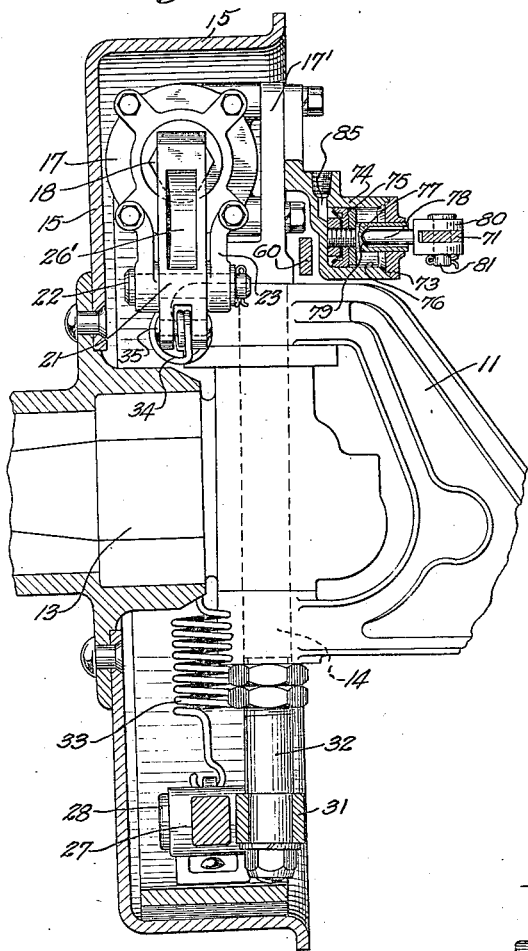
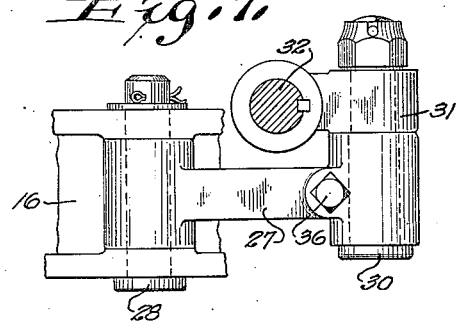
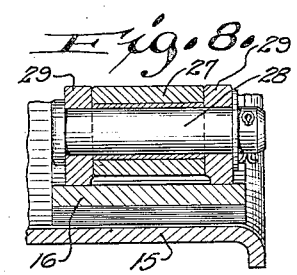
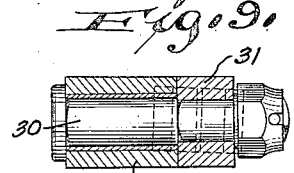
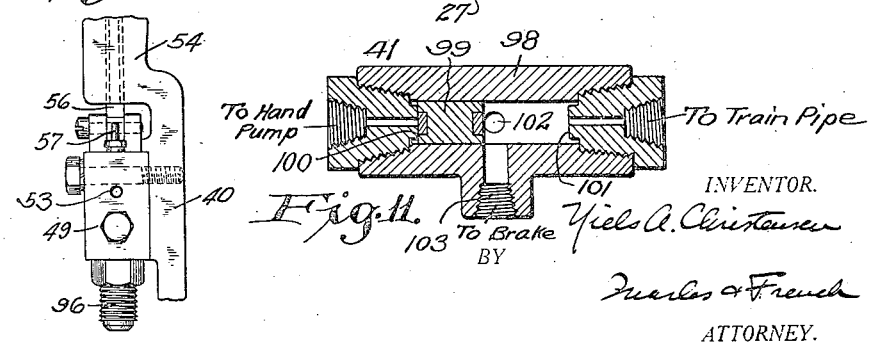
INVENTOR.
Niels A. Christensen
BY
Charles & French
ATTORNEY.

Patented Sept. 15, 1931

1,823,588

UNITED STATES PATENT OFFICE

NIELS A. CHRISTENSEN, OF CLEVELAND, OHIO

LOCKING MEANS FOR FLUID PRESSURE BRAKES

Application filed June 28, 1926. Serial No. 119,108.

The invention relates to fluid pressure brakes and more particularly to fluid pressure brake systems for use on trailer vehicles.

In my copending application, Serial No. 86,848, filed Feb. 8, 1926, for trailer vehicle brake apparatus, I have shown and described a brake system wherein provision is made for operating the brakes of the trailer either from the compressed air of the reservoir of the driving vehicle, or through the manipulation by the driver of an air pump on the trailer vehicle. In connection with such apparatus it is desirable to be able to hold the brake in application position when the vehicle stands on a hill or in any other location where danger migh: result from the release of the brake and/or when there is no air pressure in the system. The object of the present invention is to provide means for locking the brake or brakes of the trailer vehicle in braking position.

A further object of the invention is to provide locking means for the brake of such a character that the lock may be readily applied and released by the operator through the use of pressure fluid.

The invention further consists in the several features hereinafter set forth and more particularly described by claims at the conclusion hereof.

In the drawings Fig. 1 is a side elevation view of brake apparatus embodying the invention, parts being broken away;

Fig. 2 is a view partly in section of the control and operating mechanism for the brakes;

Fig. 3 is a plan view of brake apparatus embodying the invention;

Fig. 4 is a view looking into the brake drum of one of the trailer vehicle wheels;

Fig. 5 is an enlarged plan view of the brake cylinder and brake shoes and locking means associated therewith;

Fig. 6 is a detail sectional view taken on the line 6—6 of Fig. 4;

Fig. 7 is a detail sectional view taken on the line 7—7 of Fig. 4;

Fig. 8 is a detail sectional view taken on the line 8—8 of Fig. 4;

Fig. 9 is a detail sectional view taken on the line 9—9 of Fig. 4;

Fig. 10 is a detail side elevation view of a part of the operating lever.

Fig. 11 is a detail view through the intercepting valve.

Referring to Figs. 1 and 3, the numeral 10 designates the body frame of a trailer vehicle, 11 one of the axles, shown more in detail in Fig. 6, for the dirigible wheels 12 of the trailer vehicle, the hubs of the wheels being suitably mounted on steering knuckles 13 secured on pins 14 pivotally mounted on the axle in a known manner. One or more of the wheels may be provided with a brake drum 15, which is shown in Figs. 4 and 6 secured to the hub of the wheel, and a brake shoe or brake band 16 of any suitable construction is operatively associated with the fluid-pressure-operated motor or brake cylinder 17 bolted to a bracket 17', formed integral with pin 14, and used to apply the brake member or members to the drum. As any suitable form of brake cylinder may be used in the system, further description and detailed showing thereof is deemed unnecessary, it being noted that, as instanced here, a pair of pistons, not shown, work within the brake cylinder 17 and have their rods provided with polygonal heads 18 which have slots 19 therein receiving the flattened ends 20 of multiplying levers 21. each pivoted at 22 on a bracket 23 associated with the brake cylinder. Jackscrews 24 with flattened heads 25 engage and work in grooves 26' in the intermediate portions of the levers 21 so that when compressed air is introduced into the brake cylinder through a port 26 the pistons therein move outwardly causing the rods to thrust outwardly upon the levers 21 thus moving said levers outwardly and hence the jackscrews with the free ends of the brake member 16 into engagement with the drum, though it will be understood that the invention is not to be limited to the use of the levers as a direct thrust between the brake cylinder and the brake member or members may also be employed. Where, as shown, a band type brake 16 is used, it is preferably connected to the brake support by an anchor pin link 27 which is connected to a pin 28 carried by lugs 29 on the band and to an anchor pin 30 secured to a bracket 31 which is keyed and secured to the extended end 32 of the pivot pin 14. Instead of a band the brake member may be formed of pivoted shoes as, for instance, of the construction shown in my copending application Serial No. 115,604 filed June 12, 1926.

The link 27 associated with the pin 14 forms a support for the intermediate portion of the band. The intermediate portion of the band is moved to a release position by a spring 33 and its free ends to release position by springs 34 which are respectively connected to the end portions of the band, and, as shown, to pins 35 on the lower ends of the levers 21 whereby the springs also act directly on the levers to move said levers and the pistons associated therewith to a release position. The release position of the intermediate portion of the band is determined by a set-screw 36 adjustably mounted on the link 27 and secured in adjusted position by a locknut 37 and engageable with the shoe or band 16. The release position of the free ends of the band is determined by the initial adjustment of the jack-screws 25 which are adjustably mounted in lugs 38 of the band in a manner more particularly shown and described in my copending application Serial No. 703,952, filed April 3, 1924. With this construction introduction of pressure fluid, such as compressed air, between the pistons of the brake cylinder acts, as previously described, to move the free ends of the shoe into braking engagement with the drum and at the same time through the force applied thereto to move the intermediate portion of the band into engagement with the drum, the link permitting the band to swing into engagement with the drum substantially throughout its entire braking surface.

The brake cylinder 17 is supplied with compressed air either direct from the compressed air reservoir of the driving vehicle or through the operation of a hand-pump 39. The prior application, Serial No. 86,848, describes in detail a form of mechanism whereby through the use of the pump 39 associated with an operating lever 40 and with an intercepting valve 41, shown in detail in the aforementioned application, the cylinder 17 may be charged with compressed air either from the reservoir through a pipe connection with a nipple 42, or direct from the pump, the air in each instance passing from the pipe fitting 43 to a pipe 44, connected with the port 26 said fitting 43 being connected with the intercepting valve 41 which, as described in the aforementioned application and shown in detail in Fig. 11, allows air to pass either direct from the nipple 42 to the fitting 43 or from the pump cylinder 39 through pipe 45 to the fitting 43. The piston that works in the cylinder of the hand-pump 39 has a rod 46 connected by a pin 47 with the operating handle 40 and a relief valve 48 is mounted in a casing 49 carried by the handle 40 and controls the passage of air from an exhaust pipe 50 associated with the fitting 43 into a chamber 51 from which the compressed air passes through a port 52 to an exhaust port 53 connected with atmosphere when the relief valve 48 is open. The lever 40 is pivotally mounted on a pipe 44' supported on brackets 10' on the frame and connected to one of the pipes 44 and to the central port 102 in the casing 98 of the intercepting valve 41, the other pipe 44 being connected to the fitting 43 which connects with the port 103 of the intercepting valve. The relief valve 48 is under the control of the operator and is opened through the agency of a control lever 54 pivoted at 55 on the operating handle 40 and having an arm 56 engageable with a valve-operating pin 57 which is slidably mounted in the casing and has its head 58 engageable with the relief valve 48 so that when the arm 56 is swung down to move the pin 57 inwardly the relief valve 48 is opened against the action of its spring 59 and thus compressed air in the brake cylinder 17 may flow by way of the pipe 44, fitting 43, pipe 50 to atmosphere through the port 52 and conduit 53. This relief valve is used more particularly for the release of the brake when compressed air is furnished by the operator's operation of the pump 39.

In order to secure the brake in application position, I have provided locking means consisting of a bar 60 and a wedge 61 associated with parts of the brake and controlled by the operator from his position adjacent the operating lever 40. The bar 60 is pivotally mounted at one end upon the extended end of a bolt 62 carried by the free end of the band, and adjacent its hexagonal head 63, and the other end 64 of said bar has an elongated slot 65 therein working over the cylindrical shank 67 of a bolt 62' carried by the other free end of the band and similar to the bolt 62 and having an hexagonal head 68, the head 68 having a tapered portion 69. The wedge 61 works in the slot 65 between the tapered surface 69 and the inner end of the slot so that when the brake member is applied to the drum by the outward movement of the free ends of the band and the wedge 61 is moved inwardly into the slot 65 it will wedge between the inner end of said slot and the surface 69 of said head and thus prevent a subsequent release of the band from braking engagement with the drum, inasmuch as it then holds the bar 60 against movement and hence the bolts 62 and 62' and the ends of the band with which they are connected against movement. The wedge 61 is shown in Fig. 5 as having a serrated edge engaging a toothed end of the slot 65.

For moving the wedge I have shown the same as pivotally mounted at 70 on the free end of a lever 71 pivoted at 72 on a bracket associated with the head 73 of an operating cylinder 74 which is secured to the bracket 17' (Figs. 5 and 6).

The cylinder 74 has a suitably packed piston 75 working within its bore 76 and having a piston-rod 77 slidably mounted in the head 73. This rod is preferably bored to receive a thrust-pin 78 whose conical inner end seats in the conical bore 79 of the bore in said rod, and whose outer end 80 is bifurcated and receives within its bifurcations the other end of the lever 71 to which it is secured by a pivot pin 81.

The lever 71 is normally moved to release the wedge 61 by means of a spring 82 connected at one end to a lug 83 formed integral with the cylinder 74 and at its other end to a hook projection 84 on the lever 71. The pressure fluid, such as compressed air, enters the control cylinder 74 through a port 85. Each port 85 is connected by a pipe 86, including flexible sections, to a T-fitting 87 from which a pipe 88 leads to a conduit 89 in the casing 49 communicating with an inlet port 90 which is normally closed by an inlet valve 91 normally held closed by a spring 92 but adapted to be opened by an operating pin 93 similar to the pin 57 and engaged by an arm 94 on the opposite side of the control lever 54 from that of the arm 56, the opening of said inlet valve 91 against the action of the spring 92 permitting compressed air to pass from the chamber 51 past the port 90 to the conduit 89 and through piping 88, 87 and 86 to the control cylinders 74. The relief valve 48 has a tubular stem portion 95 working in a pipe nipple 96 and having passages 97 therein so that when said relief valve is closed compressed air in the system, including the fitting 43 and the pipe 50, may pass into the chamber 51 whereby a supply of compressed air for use in actuating the piston 75 is available within the chamber 51 so that when the inlet valve 91 is opened by the operator's movement of the handle 54 some of the compressed air in the brake system will be shunted to the brake cylinders 74 so that it will exert its pressure on the pistons 75 to move them outwardly and thence swing the lever 71 so as to move the wedges 61 inwardly to cooperative locked position with the bar 60 to lock the brakes in application position, it being noted that until the brakes have been applied by introduction of compressed air into the brake cylinders 17 either from the driving vehicle before the same is disconnected from the trailer vehicle or through operation of the pump 39, the operator does not move the lever 54 to open the inlet valve until the brakes have been moved to the desired application position. After the compressed air has been introduced into the cylinder 74 and the wedges 61 have been moved to locked position, the operator reverses the direction of movement of the lever 54 and thereby permits the inlet valve 91 to close and as the inlet valve has a very strong spring 92 it will be tightly closed and hence compressed air will be maintained in the locking cylinders so as to hold the wedges 61 in locked position until the movement of the operating lever 54 actuates the pin 57 to open the relief valve 48 to release compressed air in the brake cylinders 17 and as a consequence of which, due to the wedges 61 being then in locking engagement with the bar 60, the release springs 34 and 33 of the brake member will then act to assist in holding the locking means, to wit, the bars 60 and wedges 61, in locked position so that the brakes will be held in application position relative to the brake drums of the wheels of the trailer vehicle independent of the fluid-pressure-operated cylinders. Thereafter the alternate opening and closing of the valves 48 and 91 will release the air from the operating cylinders 74 so that the brakes are locked by the mechanical means previously described.

The locking of the wheels by the application and locking of the brakes permits the vehicle to be parked on a hill or any location where it is necessary to keep the brakes applied.

To release the locking means the air is introduced into the brake cylinder 17 either through the manual operation of the pump 39 or through the supply from the tractor vehicle by way of the pipe 42 until the brake members have been moved slightly beyond the position to which they have been initially set so as to permit the spring 82 to move the wedge 61 into a normal or unlocked position, in which it remains until it is again desired to lock the brakes, it being understood that when the brakes are finally locked, as previously described, the air is completely exhausted from the system, even from the brake cylinder 74 by swinging the handle 54 backward and forward so as to open the valves 91 and 48 to assure this substantially complete release of air.

The intercepting valve 41 is shown in Fig. 11 in which the numeral 98 designates the valve body, 99 the valve adapted to move either against a seat 100, closing off communication with the pipe 45, or against a seat 101, closing off communication with the reservoir or train pipe line. The body has a centrally disposed opening 102 communicating with the interior of the pipe 44' and another opening 103 disposed in the same plane and connected with the fitting 43.

Thus, it will be noted that I have provided a fluid-pressure-operated brake for trailer vehicles which may be used when the vehicle is functioning as a part of a vehicle train or when it is cut out from the train, and that when cut out the brakes may be locked in application position by mechanical means to prevent any possibility of their becoming loosened through the possible escape of compressed air from the brake cylinder and causing possible damage where the vehicle is in a position in which it might run away.

I desire it to be understood that this invention is not to be limited to any specific form or arrangement of parts except in so far as such limitations are specified in the claims.

What I claim as my invention is:

1. In a vehicle brake apparatus, the combination with the brake drum, of a brake having its free ends movable into braking engagement with said drum, spring means to release said brake from said drum, a bar associated with the free ends of said brake, and a wedge associated with said bar and brake whereby said bar and wedge cooperate with said spring means to hold the brake in applied position.

2. In a vehicle brake apparatus, the combination with the brake drum, of a brake having its free ends movable into braking engagement with said drum, spring means to release said brake from said drum, a bar associated with the free ends of said brake, a wedge associated with said bar and brake whereby said bar and wedge cooperate with said spring means to hold the brake in applied position, and fluid-pressure-operated means for moving said wedge to locked position.

3. In a vehicle brake apparatus wherein the wheel brake is fluid-pressure-operated, the combination of an inlet and relief valve for the brake system, locking means for the brake including a movable locking member, and a fluid-pressure-operated motor having a fluid-pressure-operated thrust member associated with said locking member, said inlet valve controlling the introduction of pressure fluid to said motor whereby to move said locking member to a position to lock the brake in application position, said inlet and relief valves permitting the exhaust of air from said brake system when the brake is locked in application position.

4. In a vehicle brake apparatus, the combination with a fluid-pressure-operated brake, of a manually-operated pump for supplying pressure fluid to operate said brake, mechanical means to lock said brake in applied position, a fluid-pressure motor to actuate said locking means, and a control valve associated with said pump to admit pressure fluid to said motor.

5. In a vehicle brake apparatus, the combination of a fluid-pressure-operated brake, of a manually-operated pump for supplying pressure fluid to operate said brake including an actuating member, mechanical means to lock said brake in applied position, a fluid pressure motor to actuate said locking means, and operator-controlled control valve mechanism for said motor carried by said actuating member.

In testimony whereof, I affix my signature.

NIELS A. CHRISTENSEN.